US010009460B2

(12) United States Patent
Williams et al.

(10) Patent No.: US 10,009,460 B2
(45) Date of Patent: *Jun. 26, 2018

(54) RECORDING INVOCATION OF COMMUNICATION SESSIONS

(71) Applicant: Verint Americas Inc., Alpharetta, GA (US)

(72) Inventors: Jamie Richard Williams, Fleet (GB); Marc Calahan, Marietta, GA (US); Thomas Z. Dong, Marietta, GA (US)

(73) Assignee: VERINT AMERICAS INC., Alpharetta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/192,232

(22) Filed: Jun. 24, 2016

(65) Prior Publication Data

US 2016/0381217 A1 Dec. 29, 2016

Related U.S. Application Data

(63) Continuation of application No. 14/270,287, filed on May 5, 2014, now Pat. No. 9,413,878, which is a (Continued)

(51) Int. Cl.
H04M 3/00 (2006.01)
H04M 3/42 (2006.01)
(Continued)

(52) U.S. Cl.
CPC .... H04M 3/42221 (2013.01); H04L 63/0457 (2013.01); H04L 63/0471 (2013.01);
(Continued)

(58) Field of Classification Search
CPC ................ H04M 3/42221; H04L 63/0457
(Continued)

(56) References Cited

U.S. PATENT DOCUMENTS 3,594,919 A 7/1971 De Bell et al.
3,705,271 A 12/1972 De Bell et al.
(Continued)

FOREIGN PATENT DOCUMENTS

EP 0453128 10/1991
EP 0773687 5/1997
(Continued)

OTHER PUBLICATIONS

Aspect Call Center Product Specification, "Release 2.0", Aspect Telecommunications Corporation, May 23, 1998, p. 798.
(Continued)

Primary Examiner — William Deane, Jr.
(74) Attorney, Agent, or Firm — Meunier Carlin & Curfman

(57) ABSTRACT

Systems and methods for recording a communication session between a customer and an agent of a customer center communication system are provided. In this regard, a representative method comprises: configuring a communication component of the customer center communication system to enable recording of a media stream associated with the communication session; transmitting the media stream over a network based on the configuration of the communication component; receiving the media stream over the network; and recording the received media stream.

20 Claims, 8 Drawing Sheets

Related U.S. Application Data continuation of application No. 12/967,028, filed on Dec. 13, 2010, now Pat. No. 8,718,266, which is a continuation of application No. 11/541,313, filed on Sep. 29, 2006, now Pat. No. 7,899,178.

(51) Int. Cl.

| | | |
|---|---|---|
| *H04M 3/51* | (2006.01) | |
| *H04M 3/22* | (2006.01) | |
| *H04L 29/06* | (2006.01) | |
| *H04L 29/08* | (2006.01) | |
| *H04M 7/00* | (2006.01) | |

(52) U.S. Cl.
  CPC .......... *H04L 63/166* (2013.01); *H04L 63/168* (2013.01); *H04L 67/28* (2013.01); *H04M 3/2281* (2013.01); *H04M 3/5175* (2013.01); *H04L 65/608* (2013.01); *H04M 3/5183* (2013.01); *H04M 7/006* (2013.01)

(58) Field of Classification Search
  USPC ....... 379/265.01–265.14, 266.01–266.1, 309
  See application file for complete search history.

(56) References Cited

U.S. PATENT DOCUMENTS

| | | |
|---|---|---|
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,946,375 A | 8/1999 | Pattison et al. |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |

(56) References Cited

U.S. PATENT DOCUMENTS

| | | |
|---|---|---|
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,782,412 B2 | 8/2004 | Brophy et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,940,826 B1 | 9/2005 | Simard et al. |
| 6,959,078 B1 | 10/2005 | Eilbacher et al. |
| 6,965,886 B2 | 11/2005 | Govrin et al. |
| 6,992,974 B1 | 1/2006 | Tripathi |
| 7,107,355 B2 | 9/2006 | Bethmangalkar et al. |
| 7,372,957 B2 | 5/2008 | Strathmeyer et al. |
| 7,389,240 B2 | 6/2008 | Nygren et al. |
| 7,533,404 B2 | 5/2009 | Sinz et al. |
| 7,668,901 B2 | 2/2010 | Franke et al. |
| 7,706,520 B1 | 4/2010 | Waterson et al. |
| 7,965,828 B2 | 6/2011 | Calahan et al. |
| 8,094,557 B2 | 1/2012 | Messing et al. |
| 8,094,786 B2 | 1/2012 | Ilan et al. |
| 8,102,973 B2 | 1/2012 | Peterson |
| 8,139,741 B1 | 3/2012 | Calahan et al. |
| 8,165,113 B1 | 4/2012 | Peters et al. |
| RE43,386 E | 5/2012 | Blair et al. |
| 8,259,711 B2 | 9/2012 | Elazar et al. |
| 8,291,095 B2 | 10/2012 | Cobb et al. |
| 8,948,371 B2 | 2/2015 | Odinak et al. |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0075880 A1 | 6/2002 | Dolinar et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0041253 A1 | 2/2003 | Matsui et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2004/0207724 A1 | 10/2004 | Crouch et al. |
| 2004/0208165 A1 | 10/2004 | Cai et al. |
| 2006/0087555 A1 | 4/2006 | Boyd et al. |
| 2006/0149399 A1 | 7/2006 | Norhammer et al. |
| 2006/0168111 A1 | 7/2006 | Gidwani |
| 2007/0036283 A1 | 2/2007 | Shaffer et al. |
| 2007/0058793 A1 | 3/2007 | Li et al. |
| 2007/0091907 A1 | 4/2007 | Seshadri et al. |
| 2007/0100981 A1 | 5/2007 | Adamczyk et al. |
| 2007/0201502 A1 | 8/2007 | Abramson |
| 2007/0207804 A1 | 9/2007 | Sharma et al. |
| 2007/0230345 A1 | 10/2007 | Spohrer et al. |
| 2007/0250901 A1 | 10/2007 | McIntire et al. |
| 2008/0037719 A1 | 2/2008 | Doren |
| 2009/0016522 A1 | 1/2009 | Torres et al. |

FOREIGN PATENT DOCUMENTS

| | | |
|---|---|---|
| EP | 0989720 | 3/2000 |
| GB | 2369263 | 5/2002 |
| WO | 1998/043380 | 11/1998 |
| WO | 2000/016207 | 3/2000 |

OTHER PUBLICATIONS

"Customer Spotlight: Navistar International," Web page, unverified print date of Apr. 1, 2002.
DKSystems Integrates QM Perception with OnTrack for Training, Web page, unverified print date of Apr. 1, 2002, unverified cover date of Jun. 15, 1999.
Abstract, net.working: "An Online Webliography," Technical Training pp. 4-5 (Nov./Dec. 1998).
Adams et al., "Our Turn-of-the-Century Trend Watch" Technical Training, pp. 46-47, (Nov./Dec. 1998).
Anderson: Interactive TVs New Approach, The Standard, Oct. 1, 1999.
Ante, "Everything You Ever Wanted to Know About Cryptography Legislation . . . (But Were too Sensible to Ask)", PC World Online, Dec. 14, 1999.
Barron, "The Road to Performance: Three Vignettes," Technical Skills and Training, pp. 12-14 (Jan. 1997).
Bauer, "Technology Tools: Just-in-Time Desktop Training is Quick, Easy, and Affordable," Technical Training, pp. 8-11 (May/Jun. 1998).
Beck et al., "Applications of AI in Education," AMC Crossroads vol. 1:1-13 (Fall 1996), Web page, unverified print date of Apr. 12, 2002.
Benson and Cheney, "Best Practices in Training Delivery," Technical Training pp. 14-17 (Oct. 1996).
Bental and Cawsey, "Personalized and Adaptive Systems for Medical Consumer Applications," Communications ACM 45(5):62-63 (May 2002).
Berst, "It's Baa-aack. How Interactive TV is Sneaking Into Your Living Room", The AnchorDesk, May 10, 1999.
Berst, "Why Interactive TV Won't Turn You On (Yet)", The AnchorDesk, Jul. 13, 1999.
Blumenthal et al., "Reducing Development Costs with Intelligent Tutoring System Shells," pp. 1-5, Web page, unverified print date of Apr. 9, 2002, unverified cover date of Jun. 10, 1996.
Borland and Davis, "US West Plans Web Services on TV", CNETNews.com, Nov. 22, 1999.
Brown, "Let PC Technology Be Your TV Guide", PC Magazine, Jun. 7, 1999.
Brown, "Interactive TV: The Sequel", NewMedia, Feb. 10, 1998.
Brusilovsky, "Adaptive Educational Systems on the World-Wide-Web: A Review of Available Technologies," pp. 1-10, Web Page, unverified print date of Apr. 12, 2002.
Brusilovsky, et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.
Brusilovsky, et al., ISIS-Tutor: An Intelligent Learning Environment for CD/ISIS Users, pp. 1-15 Web page, unverified print date of May 2, 2002.
"Building Customer Loyalty Through Business-Driven Recording of Multimedia Interactions in your Contact Center," Witness Systems promotional brochure for eQuality, (2000).
Byrnes et al., "The Development of a Multiple-Choice and True-False Testing Environment on the Web," pp. 1-8, Web page, unverified print date Apr. 12, 2002, unverified cover date of 1995.
Calvi and De Bra, "Improving the Usability of Hypertext Courseware through Adaptive Linking," ACM, unknown page numbers (1997).
Center Products We Saw in 1999, Web page, unverified print date of Mar. 20, 2002, unverified cover date of Feb. 1, 2000.
Cline, "Deja vu—Will Interactive TV Make It This Time Around?", DevHead, Jul. 9, 1999.
Coffey, "Are Performance Objectives Really Necessary?" Technical Skills and Training pp. 25-27 (Oct. 1995).
Cohen, "Knowledge Management's Killer App," pp. 1-11, Web page, unverified print date of Apr. 12, 2002, unverified cover date of 2001.
Cole-Gomolski, "New ways to manage E-Classes," Computerworld 32(48):4344 (Nov. 30, 1998).
Cross, "Sun Microsystems—the SunTAN Story," Internet Time Group 8 (2001).

(56) References Cited

OTHER PUBLICATIONS

Crouch, "TV Channels on the Web", PC World, Sep. 15, 1999.
D'Amico, "Interactive TV Gets $99 set-top box," IDG.net, Oct. 6, 1999.
Davis, "Satellite Systems Gear Up for Interactive TV Fight", CNETNews.com, Sep. 30, 1999.
De Bra et al., "Adaptive Hypermedia: From Systems to Framework," ACM (2000).
De Bra, "Adaptive Educational Hypermedia on the Web," Communications ACM 45(5):60-61 (May 2002).
Dennis and Gruner, "Computer Managed Instruction at Arthur Andersen & Company: A Status Report," Educational Technical, pp. 7-16 (Mar. 1992).
Diederich, "Web TV Data Gathering Raises Privacy Concerns", ComputerWorld, Oct. 13, 1998.
Diessel et al., "Individualized Course Generation: A Marriage Between CAL and ICAL," Computers Educational 22(1/2)57-64 (1994).
Dyreson, "An Experiment in Class Management Using the World-Wide Web," pp. 1-12, Web page, unverified print date of Apr. 12, 2002.
EchoStar, "MediaX Mix Interactive Multimedia With Interactive Television", PRNews Wire, Jan. 11, 1999.
E Learning Community, "Excellence in Practice Award: Electronic Learning Technologies," Personal Learning Network pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
E-Learning the future of learning, THINQ Limited, London, Version 1.0 (2000).
Eline, "A Trainer's Guide to Skill Building," Technical Training pp. 34-41 (Sep./Oct. 1998).
Eline, "Case Study: Bridging the Gap in Canada's IT Skills," Technical Skills and Training pp. 23-25 (Jul. 1997).
Eline, "Case Study: IBT's Place in the Sun," Technical Training pp. 12-17 (Aug./Sep. 1997).
Fritz, "CB templates for productivity: Authoring system templates for trainers," Emedia Professional 10(8):6876 (Aug. 1997).
Fritz, "ToolBook II: Asymetrix's updated authoring software tackles the Web," Emedia Professional 10(2):102106 (Feb. 1997).
Furger, "The Internet Meets the Couch Potato", PCWorld, Oct. 1996.
Gibson et al., "A Comparative Analysis of Web-Based Testing and Evaluation Systems," pp. 1-8, Web page, unverified print date of Apr. 11, 2002.
Hallberg and DeFlore, "Curving Toward Performance: Following a Hierarchy of Steps Toward a Performance Orientation," Technical Skills and Training pp. 9-11 (Jan. 1997).
Harsha, "Online Training "Sprints" Ahead," Technical Training pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," Technical Skills and Training pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
"Hong Kong Comes First with Interactive TV", Sci-Tech, Dec. 4, 1997.
Kane, AOL-Tivo: You've Got Interactive TV, ZDNN, Aug. 17, 1999.
Kay, "E-Mail in Your Kitchen", PC World Online, Mar. 28, 1996.
"Keeping an Eye on Your Agents," Call Center Magazine, pp. 32-34, Feb. 1993 LPRs & 798.
Kenny, "TV Meets Internet", PC World Online, Mar. 28, 1996.
Koonce, "Where Technology and Training Meet," Technical Training pp. 10-15 (Nov./Dec. 1998).
Kursh, "Going the distance with Web-based training," Training and Development 52(3):5053 (Mar. 1998).
Larson, "Enhancing Performance Through Customized Online Learning Support," Technical Skills and Training pp. 25-27 (May/Jun. 1997).
Linderholm, "Avatar Debuts Home Theater PC", PC World Online, Dec. 1, 1999.
Linton et al., "OWL: A Recommender System for Organization-Wide Learning," Educational Technical Society 3(1):62-76 (2000).
Lucadamo and Cheney, "Best Practices in Technical Training," Technical Training pp. 21-26 (Oct. 1997).
McNamara, "Monitoring Solutions: Quality Must Be Seen and Heard," Inbound/Outbound pp. 66-67 (Dec. 1989).
Merrill, "The New Component Design Theory: Instruction design for courseware authoring," Instructional Science 16:19-34 (1987).
Metheus X Window Record and Playback, XRP Features and Benefits, 2 pages, Sep. 1994 LPRs.
Minton-Eversole, "IBT Training Truths Behind the Hype," Technical Skills and Training pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" American Association for Artificial Intelligence, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc., USA.
Needle, "Will The Net Kill Network TV?", PC World Online, Mar. 10, 1999.
Nelson et al., "The Assessment of End-User Training Needs," Communications ACM 38(7):27-39 (Jul. 1995).
Notification of Transmittal of the International Search Report and the Written Opinion of the International Searching Authority, dated Sep. 24, 2008.
Notification of Transmittal of the International Search Report and the Written Opinion of the International Searching Authority, dated Apr. 9, 2009.
O'Herron, "CenterForce Technologies' CenterForce Analyzer," Web page, unverified print date of Mar. 20, 2002, unverified cover date of Jun. 1, 1999.
O'Roark, "Basic Skills Get a Boost," Technical Training pp. 10-13 (Jul./Aug. 1998).
"On Evaluating Educational Innovations," Pamplhlet authored by Alan Lesgold, unverified cover date of Mar. 5, 1998.
"OnTrack Online Delivers New Web Functionality," Web page, unverified print date of Apr. 2, 2002, unverified cover date of Oct. 5, 1999.
Papa et al., "A Differential Diagnostic Skills Assessment and Tutorial Tool," Computer Education 18(1-3):45-50 (1992).
PCT International Search Report, International Application No. PCT/US03/02541, dated May 12, 2003.
Phaup, "New Software Puts Computerized Tests on the Internet: Presence Corporation announces breakthrough Question Mark Web product," Web page, unverified print date of Apr. 1, 2002.
Phaup, "QM Perception Links with Integrity Training's WBT Manager to Provide Enhanced Assessments for Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available to high-volume users," Web page, unverified print date of Apr. 1, 2002, unverified cover date of May 6, 1996.
Piskurich, "Now-You-See-'Em, Now-You-Don't Learning Centers," Technical Training pp. 18-21 (Jan./Feb. 1999).
"Price Waterhouse Coopers Case Study: The Business Challenge," Web page, unverified cover date of 2000.

(56) References Cited

OTHER PUBLICATIONS

Read, "Sharpening Agents' Skills," pp. 1-15, Web page, unverified print date of Mar. 20, 2002, unverified cover date of Oct. 1, 1999.
Reid, "On Target: Assessing Technical Skills," Technical Skills and Training pp. 6-8 (May/Jun. 1995).
Rohde, "Gates Touts Interactive TV", InfoWorld, Oct. 14, 1999.
Ross, "Broadcasters Use TV Signals to Send Data", PC World, Oct. 1996.
Stewart, "Interactive Television at Home: Television Meets the Internet", Aug. 1998.
Stormes, "Case Study: Restructuring Technical Training Using ISD," Technical Skills and Training pp. 23-26 (Feb./Mar. 1997).
Tennyson, "Artificial Intelligence Methods in Computer-Based Instructional Design," Journal of Instruction Development 7(3):17-22 (1984).
Tinoco et al., "Online Evaluation in WWW-based Courseware," ACM pp. 194-198 (1997).
Uiterwijk et al., "The virtual classroom," InfoWorld 20(47):6467 (Nov. 23, 1998).
Unknown Author, "Long-distance learning," InfoWorld 20(36):7276 (1998).
Untitled, 10th Mediterranean Electrotechnical Conference vol. 1 pp. 124-126 (2000).
Watson and Belland, "Use of Learner Data in Selecting Instructional Content for Continuing Education," Journal of Instructional Development 8(4):29-33 (1985).
Weinschenk, "Performance Specifications as Change Agents," Technical Training pp. 12-15 (Oct. 1997).
Wilson, "U.S. West Revisits Interactive TV", Interactive Week, Nov. 28, 1999.

US 10,009,460 B2

RECORDING INVOCATION OF COMMUNICATION SESSIONS

CROSS-REFERENCE TO RELATED APPLICATIONS

The present application is a continuation of U.S. patent application Ser. No. 14/270,287, filed May 5, 2014, which is a continuation of U.S. patent application Ser. No. 12/967,028, filed Dec. 13, 2010, which is a continuation of U.S. patent application Ser. No. 11/541,313, filed Sep. 29, 2006, all entitled "Recording Invocation of Communication Sessions," the disclosures of which are incorporated herein by reference in their entireties.

TECHNICAL FIELD

The present disclosure is generally related to recording media streams associated with interactions between customers and agents.

BACKGROUND

A traditional passive tap recording technique includes recorders that are deployed along routes of communications. In this technique, each recorder operates similar to a "sniffer" by analyzing pass-by communication packets. The recorder records the packets corresponding to certain communication sessions based on its configuration.

In an IP telephony environment at, for example, a customer center, recorders are typically deployed either at a voice gateway, which interfaces between the Internet Protocol (IP) network and the public switched telephone network (PSTN), or at switches in order to stay along the routes of the communications. This technique has the advantages, among others, of (1) minimum intrusion into a communication system, (2) cost effectiveness in deployment for companies with centralized office locations, and (3) easy scalability for compliance recording.

To communicate with any agents at the customer center, a customer communication device, such as a time domain multiplexing (TDM) or a voice over Internet Protocol (VOIP) phone, first sends communication signals to a call-processing device of the customer center, such as a soft switch. The communication signals can be sent either directly to the call-processing device in case of IP to IP communications or via a media processing device, such as a voice gateway in case of TDM to IP. The communication network can be a PSTN network or an IP-based network.

Once the communication signals have been received, the call-processing device then routes the communication signals to an agent phone. After several rounds of communication signal exchange, media communications between the agent's phone and customer's phone can proceed via the media processing device and distribution devices. The distribution devices are network routers and switches.

In order to record the media communications using passive tapping, recorders are deployed at the media processing device or distribution devices using the network traffic monitoring or duplicating features, such as Cisco™ Switch Port Analyzer (SPAN) feature, on these devices. These tapping features are often available to the recorders that are directly connected to the media processing device or distribution devices, namely to recorders deployed a customer center telephony system.

The traditional passive tap recording technique is typically deployed in a telephony environment that has little to no "intelligence" in managing and recording media communications. Customer Centers are perpetually looking for ways to improve the recording features of their telephony components. One way, among others, is to provide more "intelligence" within the customer telephony system and the recording system.

SUMMARY

Systems and methods for recording a communication session between a customer and an agent of a customer center communication system are provided. In this regard, a representative method comprises: configuring a communication component of the customer center communication system to enable recording of a media stream associated with the communication session; transmitting the media stream over a network based on the configuration of the communication component; receiving the media stream over the network; and recording the received media stream.

Other systems, methods, features, and advantages of the present disclosure will become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Customer center includes, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which media streams associated with an interaction can be recorded.

Systematic Diagram Using a Proxy Server

Figure 1:
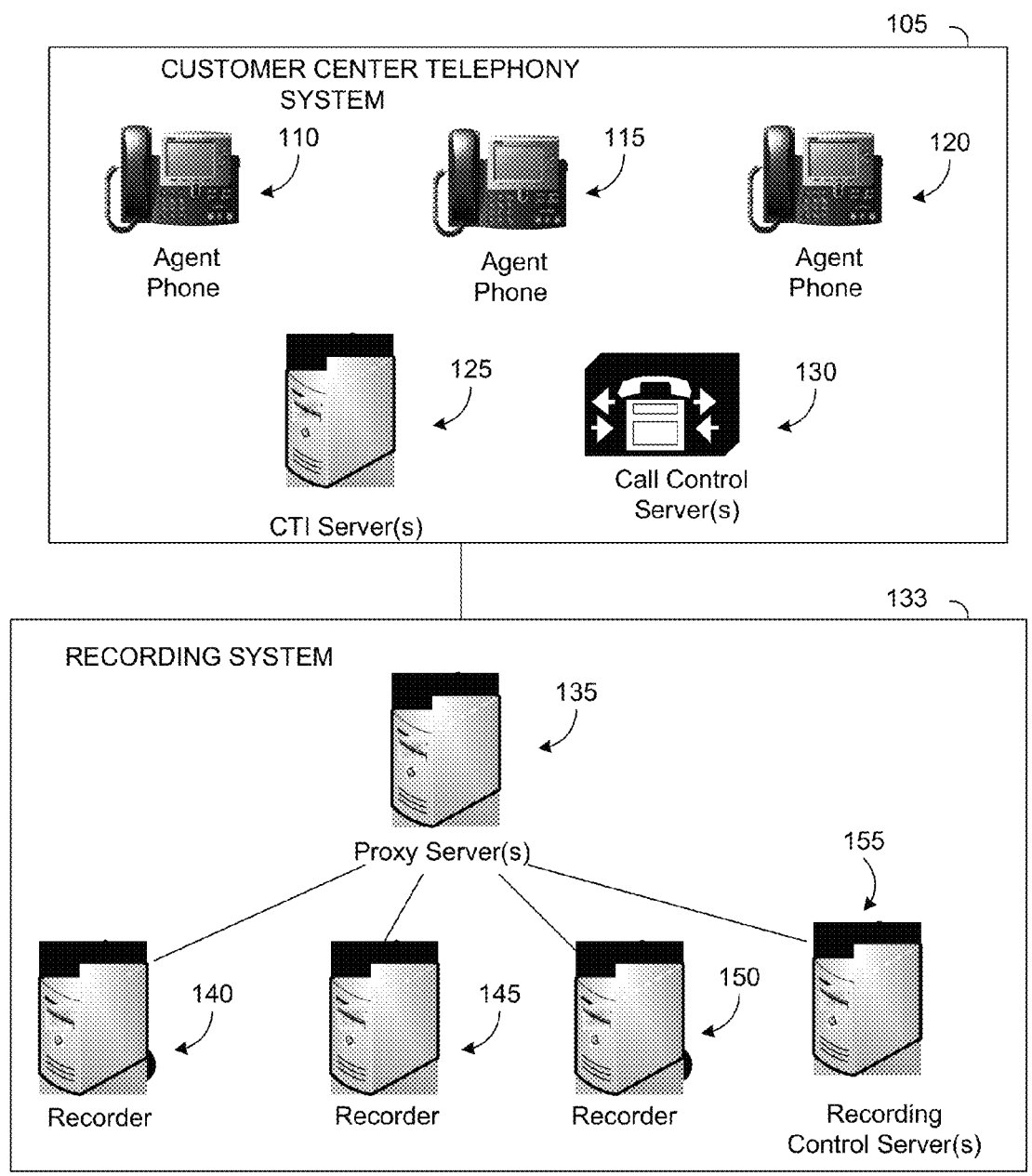
FIG. 1 is a schematic diagram of an embodiment of a system in which media communications can be recorded using a proxy server.

Referring now in more detail to the figures, FIG. 1 is a schematic diagram of an embodiment of a system in which media communications can be recorded using a proxy server. A customer center telephony system 105 has one or more agent phones 110, 115, 120 that are coupled to one or more computer-telephone integration (CTI) servers 125 and one or more call control servers 130. The customer center telephony system 105 is coupled to the recording system 133, which includes one or more proxy servers 135, one or more recorders 140, 145, 150, and one or more recording control servers 155.

In general, the proxy server 135 is a computer that offers a computer network service to allow clients to make indirect network connections to other network services. A client connects to the proxy server 135, then requests a connection, file, or other resource available on a different server, e.g., the CTI server 125, call control server 130, and recording control server 155, among others.

The proxy server 135 functions as a single node for the customer center telephony system 105 or any third party system (not shown) to communicate with. The proxy server can pass requests (modified) from the customer center telephony system 105 on to the recorders 140, 145, 150 to complete the requests.

Alternatively or additionally, the proxy server accumulates and saves files that are most often requested in a cache.

The proxy server 135 provides the resource either by connecting to the specified server or by serving it from the cache. In some cases, the proxy server 135 can alter the client's request or the server's response for various purposes. The proxy server 135 can also serve as a firewall. In one embodiment, the proxy server 135 can be described as a buffer between a computer and the resources being accessed.

The cache of the proxy server 135 may already contain information needed by the time of the request, making it possible for the proxy server 135 to deliver the information immediately. Therefore, the proxy server 135 can potentially increase the speed of communication to the servers.

Alternatively or additionally, the proxy server 135 can operate in a hybrid recording environment and communicate with recorders that operate in a hybrid recording mode, in which both active recording and passive sniffing are performed.

It should be noted that the proxy server 135 is shown in FIG. 1 as a separate device from the other components of the recording system 133. However, the proxy server 135 can also be deployed on one of the recorders 140, 145, 150 or on other servers, such as the recording control servers 155. The proxy server 135 can communicate with the CTI server 125 and/or the call control server 130 to receive call events and other call related information such as agent identifications. The communication can also involve the recording of at least one media stream associated with an interaction within the customer center telephony system 105.

The customer center telephony system 105 can be configured to send call requests to or receive call requests from the proxy server 135. The customer center telephony system 105 can further be configured to send duplicated media streams associated with the interactions to be recorded to the destinations negotiated in the call request process. The proxy server 135 can also invoke and send requests to the customer center telephony system 105 to request the duplicated media streams of interactions based on received CTI events and information or other call notification systems, such as SIP, for example.

The proxy server 135 can route the duplicated media streams associated with the interactions to the recorders 140, 145, 150 based on various conditions, criteria, or policies. The proxy server 135 can also re-direct the calls to a different proxy server based on load, bandwidth, or other configurations. The proxy server 135 can communicate with the recorders 140, 145, 150 using standard call control protocols, such as session initiation protocol (SIP), H323, media gateway control protocol (MGCP), or skinny client control protocol (SCCP), or using proprietary protocols, or using static configurations. The operation of the proxy server is further described in relation to FIGS. 6-8.

Session Initiation Protocol (SIP)

Briefly, SIP is an application layer control simple signaling protocol for Voice Over Internet Protocol (VoIP) implementations. SIP is a textual client-server based protocol that the end user systems and proxy servers can provide call forwarding, callee and caller number identification, basic Automatic Call Distribution (ACD) and personal mobility, among others.

SIP addresses are generally in the form of a Uniform Resource Location (URL). The SIP addresses can be embedded in Web pages and therefore can be integrated as part of implementations such as Click to talk, for example. SIP using simple protocol structure, provides fast operation, flexibility, scalability and multiservice support. SIP provides its own reliability mechanism. SIP creates, modifies and terminates sessions with one or more participants. These sessions include Internet multimedia conferences, Internet telephone calls and multimedia distribution. Members in a session can communicate using multicast or using a mesh of unicast relations, or a combination of these. SIP invitations used to create sessions carry session descriptions, which allow participants to agree on a set of compatible media types.

SIP supports user mobility by proxying and redirecting requests to the user's current location. Users can register their current location. SIP is not tied to any particular conference control protocol. It is designed to be independent of the lower-layer transport protocol and can be extended with additional capabilities. SIP transparently supports name mapping and redirection services, allowing the implementation of Integrated Services Digital Network (ISDN) and Intelligent Network telephony subscriber services. These facilities also enable personal mobility which is based on the use of a unique personal identity. SIP supports five facets of establishing and terminating multimedia communications: 1) User location, 2) User capabilities, 3) User availability, 4) Call setup, and 5) Call handling.

SIP can also initiate multi-party calls using a multipoint control unit (MCU) or fully-meshed interconnection instead of multicast. Internet telephony gateways that connect Public Switched Telephone Network (PSTN) parties can also use SIP to set up calls between them. SIP is designed as part of a multimedia data and control architecture currently incorporating protocols, such as Resource Reservation Protocol (RSVP), Real-Time Transport Protocol (RTP), Real-Time Streaming Protocol (RTSP), and Service Advertising Protocol (SAP), among others. However, the functionality and operation of SIP does not depend on any of these protocols. SIP can also be used in conjunction with other call setup and signaling protocols. In that mode, an end system uses SIP exchanges to determine the appropriate end system address and protocol from a given address that is protocol-independent. For example, SIP could be used to determine that the party can be reached using H.323, to find the H.245 gateway and user address, and then use H.225.0 to establish the call.

H.323 Protocol

H.323 is a protocol that generally provides audio-visual communication sessions on any packet network. Currently, H.323 is implemented by various Internet real-time applications such as NetMeeting and Ekiga. H.323 is commonly used in voice over Internet Protocol (VoIP, Internet Telephony, or IP Telephony) and IP-based videoconferencing.

Media Gateway Control Protocol (MGCP)

MGCP is a standard protocol generally for handling the signaling and session management needed during a multimedia conference. The protocol defines a means of communication between a media gateway, which converts data from the format required for a circuit-switched network to that required for a packet-switched network and the media gateway controller. MGCP can be used to set up, maintain, and terminate calls between multiple endpoints. MGCP can be used for controlling telephony gateways from external call control elements, such as the media gateway controllers or call agents. MGCP assumes a call control architecture where the call control intelligence is outside the gateways and handled by external call control elements. The MGCP assumes that these call control elements, or Call Agents, can synchronize with each other to send coherent commands to the gateways under their control. MGCP is, in essence, a master/slave protocol, where the gateways are generally expected to execute commands sent by the Call Agents.

Skinny Client Control Protocol (SCCP)

SCCP defines a simple and easy to use architecture. An H.323 proxy server can be used to communicate with the Skinny Client using the SCCP. In such a case, the telephone is a skinny client over IP, in the context of H.323. A proxy server is used for the H.225 and H.245 signaling. The end stations (such as the agent phone 110, 115, 120) can run what is called the Skinny Client, which consumes less processing overhead. The Skinny Client can communicate with the call control server 130 to establish a call with another phone 110, 115, 120. Once the call control server 130 has established the call, the two phones use connectionless (UDP/IP-based) communication for audio transmissions. Costs and overhead are thus reduced by confining the complexities of H.323 call setup to the call control server 130, and using the Skinny protocol for the actual audio communication into and out of the end stations.

Simply Call Flow Diagram

Figure 2:
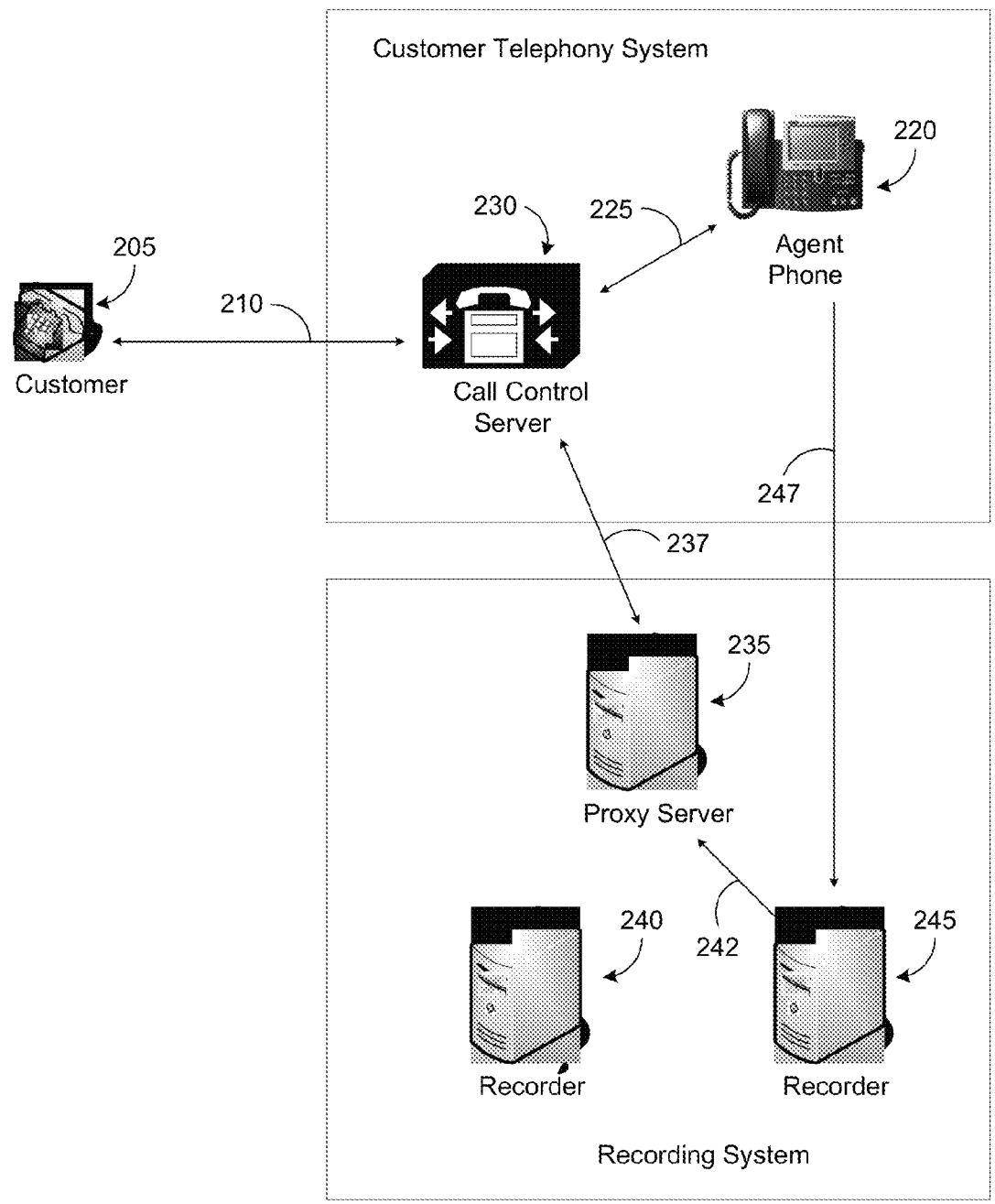
FIG. 2 illustrates an exemplary call flow in recording media streams associated with a call.

FIG. 2 illustrates an exemplary call flow in recording media streams associated with a call. Upon receiving a call request for an agent's extension via line 210, a call control server 230 checks the recording configuration for that extension. If the extension is configured for recording, in addition to the normal call setup procedures, the call control server 230 sends call requests to a proxy server 235 and the agent phone 220 to establish dialogs for recording via lines 225 and 237. Upon receiving the call request from the call control server 230, the proxy server 235 routes the call from the call control server 230 to one of the recorders 240, 245 via lines 237, 242. The recorders are registered with the proxy server 235 based on, for example, a recording load balancing algorithm, among others. Upon receiving a positive confirmation from the selected recorder 245, the proxy server 235 can include an IP address and port of the selected recorder 245 in its responses as part of the call control flow.

Upon having successfully established the dialogs, the call control server 230 instructs the agent's phone 220 via line 225 to send duplicated media streams of the on-going call to the recorder 245. The agent phone 220 duplicates media streams and sends the duplicated media streams via line 247, in the format of the, for example, real-time transport protocol (RTP) packets, of the call directly to the recorder 245. The recorder 245 can associate two of the media streams of the same call and record them as, for example, a single media stream. When the call ends, the call control server 230 terminates the dialog with the proxy server 235 using the call control protocol via line 237. The proxy server 235 sends a call end message to the recorder 242 via line 242.

Call Flows for Recording Using a Proxy Server

Figures 3A, 3B, 3C:
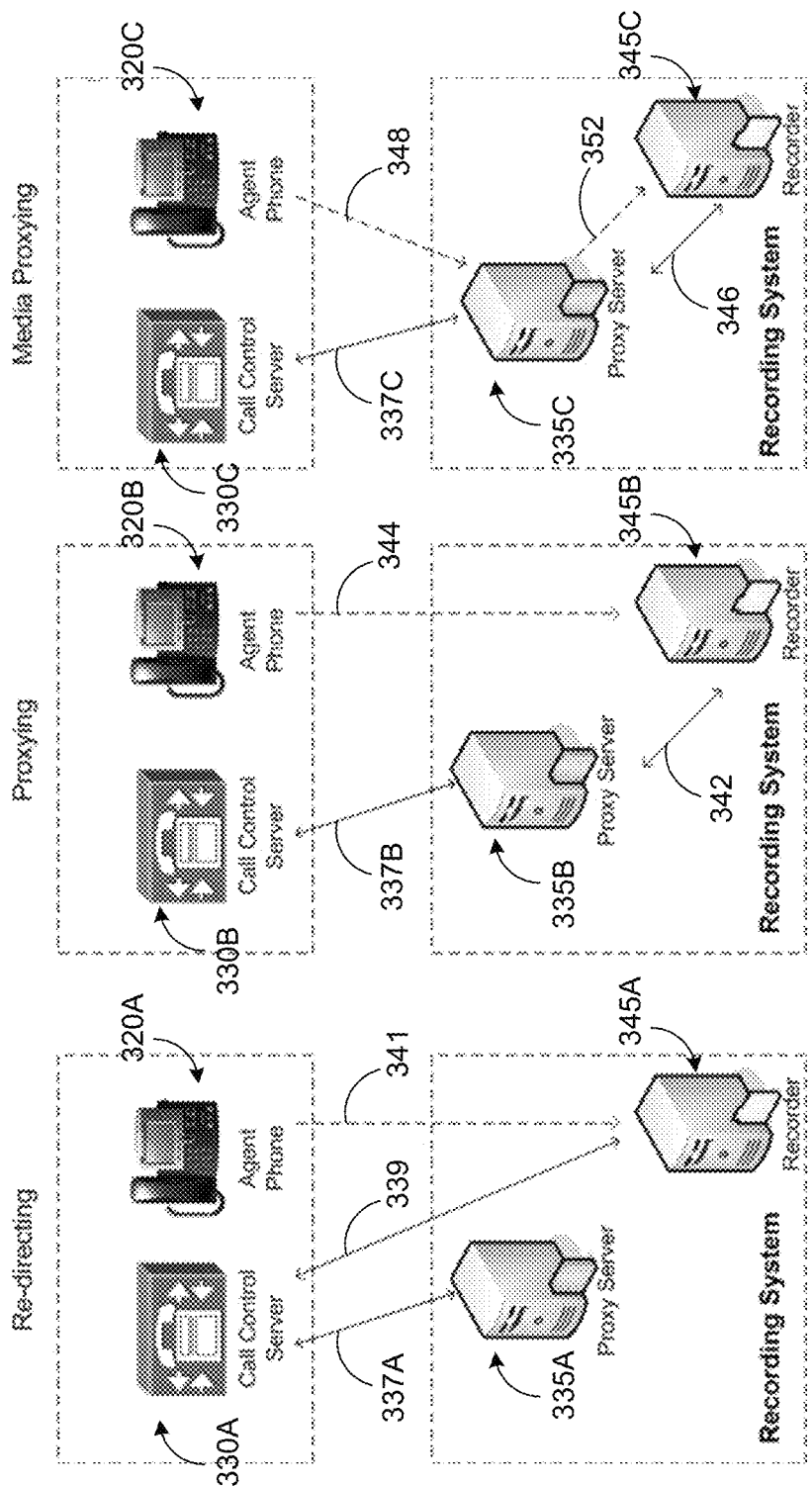
FIGS. 3A-C illustrate exemplary call flows for recording two or more duplicated media streams associated with a call using a proxy server, such as that shown in FIG. 1.

FIGS. 3A-C illustrate exemplary call flows for recording one or more duplicated media streams associated with a call using a proxy server, such as that shown in FIG. 1. The call control servers 330A-C send call requests to proxy servers 335A-C and the agent phones 320A-C to establish dialogs for recording media streams via lines 337A-C. The two or more duplicated media streams can be sent to a recording system in a single call dialog or as two separate call dialogs. In case of two separate call dialogs, a unique call identification of the original call may be included in the information of the two call dialogs to link the relationship between them.

Referring now to FIG. 3A, the proxy server 335A instructs the call control server 330A via line 337A to re-direct the calls to a recorder 345A. The call control server 330A instructs the agent phone 320A, gateways (not shown), conference bridges (not shown) and other telephony components to duplicate the media streams and transmit the duplicated media streams to the recorder 345A. The call control server 330A communicates with the recorder 345A to establish a dialog for recording the duplicated media streams via line 339. The agent phone 320A transmits the duplicated media streams to the recorder 345A via line 341.

Referring to FIG. 3B, the proxy server 335B proxies the call and directs an agent phone 320B to send the duplicated media streams directly to recorder 345B. The proxy server 335B communicates with the recorder 345B to establish a dialog for recording the duplicated media streams via line 342. The call control server 330B instructs with the agent phone 320B to duplicate the media streams and transmit the duplicated media streams directly to the recorder 345B. The agent phone 320B transmits the duplicated media streams directly to the recorder 345B via line 344.

Referring to FIG. 3C, the proxy server 335C proxies the call as well as the duplicated media streams. The proxy server 345C communicates with the recorder 335C to establish a dialog for recording the duplicated media streams via line 346. The call control server 330C instructs the agent phone 320C to duplicate the media streams and transmit the duplicated media streams to the proxy server 335C. The agent phone 320C transmits the duplicated media streams to the proxy server 335C via line 348. The proxy server 335C receives the duplicated media streams and transmits the duplicated media streams to the recorder 345C via line 352.

The proxy servers 335 in FIGS. 3A-C may use the standard call control calls such as SIP, H323, which may or may not be the same as the protocol it uses to communicate with the telephony system, to communicate with the recorders. The proxy server may also use other protocols to communicate with the recorders 345.

Recorder Failover Solution

Figure 4:
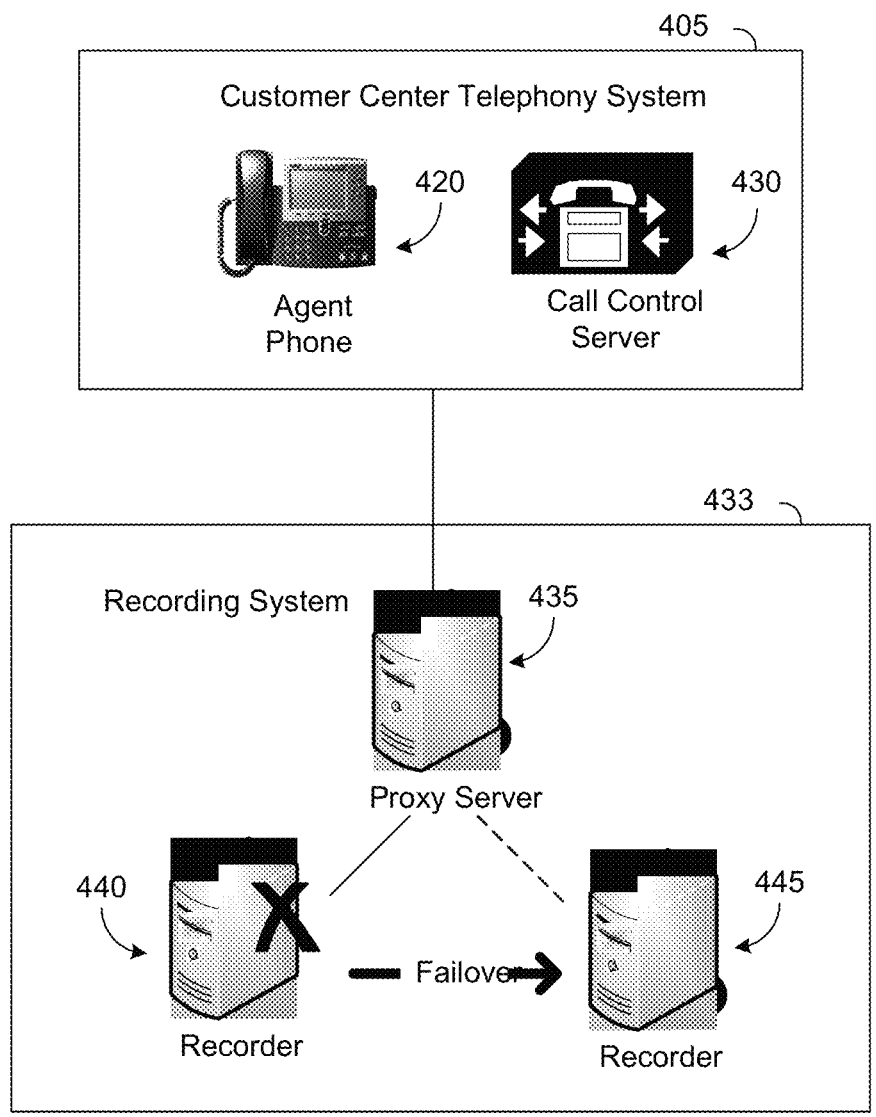
FIG. 4 is an exemplary schematic diagram that illustrates a recorder failover solution.

FIG. 4 is a schematic diagram that illustrates an embodiment that utilizes recorder failover. A proxy server 435 communicates with a customer center telephony system 405, which includes an agent phone 420 and a call control server 430, among others. The proxy server 435 communicates with multiple recorders 440, 445 of a recording system 433. If the recorder 440 malfunctions, the proxy server 435 can communicate with the recorder 445 to record media streams associated with the interactions within the customer center telephony system 405, and vice versa. If the recorders 440, 445 malfunction, the proxy server 435 can communicate with another recorder (not shown) to record the media streams associated with the interactions within the customer center telephony system 405. Alternatively or additionally, the proxy server 435 detects that a recorder fails and sends a redirect message (or reINVITE message as in the case with SIP) to the Customer Center telephony system to transmit the existing call/recordings to a "good" recorder.

Proxy Failover Solution

Figure 5:
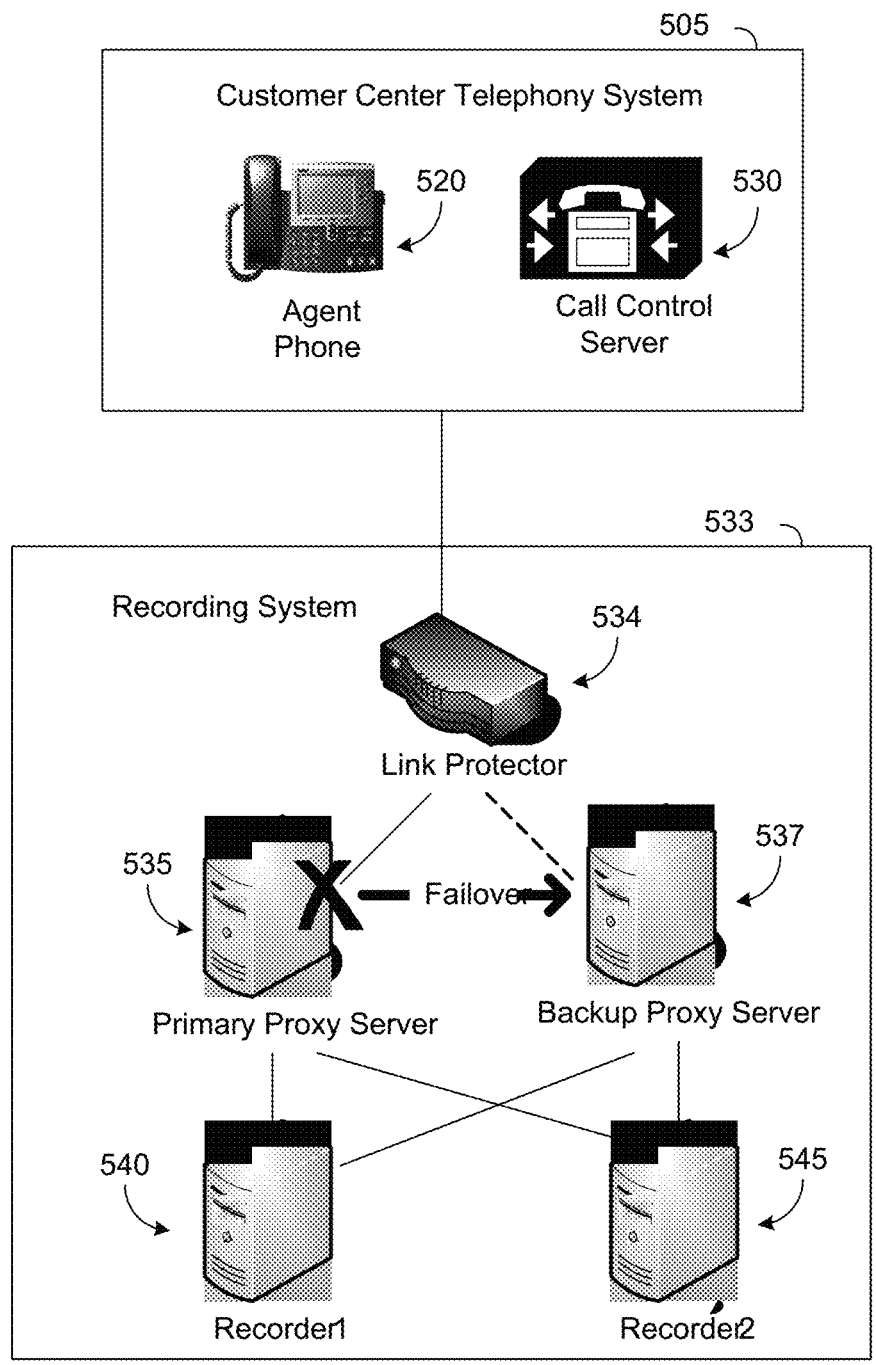
FIG. 5 is an exemplary schematic diagram that illustrates a proxy failover solution.

FIG. 5 is an exemplary schematic diagram that illustrates an embodiment that utilizes proxy failover. The proxy failover solution can use a link protector 534, which communicates with a customer center telephony system 505. The system 505 includes an agent phone 520 and a call control server 530, among others. Multiple proxy servers connect to the link protector 534. In this example, proxy server 535 serves as a primary server and proxy server 537 and other servers (not shown) serve as back-ups. The proxy servers 535, 537 can have the same IP address on the network interface, connecting to the link protector. These proxy servers 535, 537 connect to the same pool of recorders 540, 545. During normal operation, the link protector 534 passes network traffic to the primary proxy server 535. Upon having detected that connection to the primary proxy server 535 is down, the link protector 534 passes traffic to the backup proxy server 357.

Alternatively or additionally, proxy failover can be achieved by configuring the multiple proxy servers 535, 537 with different IP addresses but the same domain name system (DNS) name. In this implementation, the multiple proxy servers 535, 537, connecting to the same pool of recorders are utilized. These proxy servers 535, 537, with different IP addresses on the interface connecting to the customer center telephony system 505, are registered with the same DNS name. The customer center telephony system 505 is configured with the DNS names of the proxy servers 535, 537 for communicating with the proxy servers 535, 537. For example, the customer center telephony system 505 queries for the DNS of the proxy servers 535, 537 to obtain the proxy servers' IP addresses. Responsive to the query, the customer center telephony system 505 receives the proxy servers' IP addresses and maintains a list of the IP addresses in a DNS database. The customer center telephony system 505 generally exhausts the entire list to find an IP address to successfully connect to the proper proxy server.

Alternatively or additionally, proxy failover can be achieved by configuring a primary and multiple secondary proxy servers in the customer center telephony system 505. Alternatively or additionally, a failover solution can be achieved by instructing the recorders 540, 545 to switch to passive (sniffing) recording provided that the recorders 540, 545 are configured with a hybrid recording mode.

Flow Diagram Depicting Operation of Recording Media Streams

Figure 6:
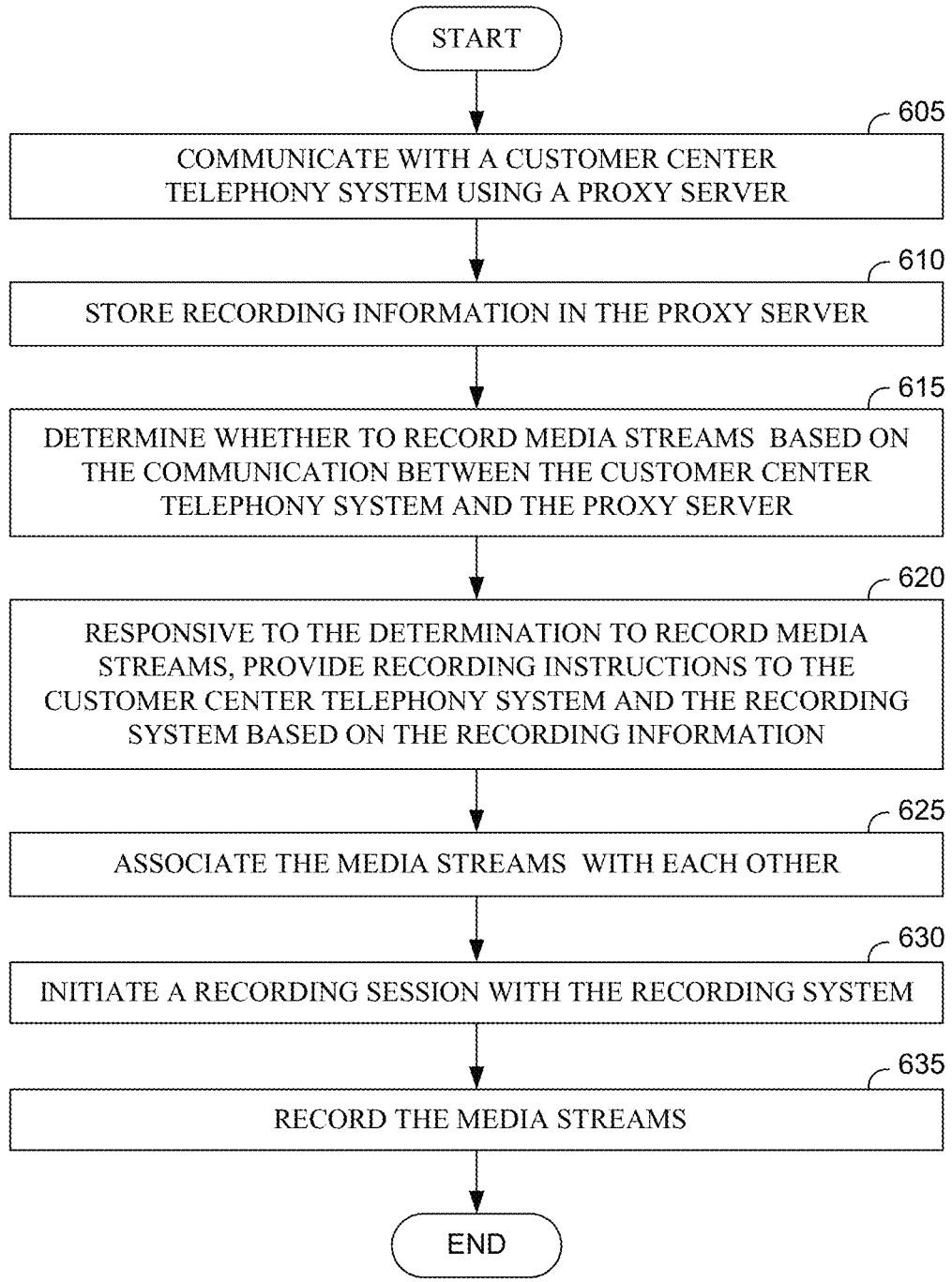
FIG. 6 is a flow diagram that illustrates an exemplary operation for recording media streams associated with a call.

FIG. 6 is a flow diagram that illustrates operation of an embodiment in which media streams associated with an interaction are recorded. Beginning with block 605, a customer center telephony system communicates with a proxy server for recording the media streams of the interaction. For example, a customer center's telephony infrastructure can configure each telephony component, such as an agent phone with an extension, gateway, call control server, and CTI server, among others, with recording options. The recording options can include, but are not limited to the following:

1. "Do not record", which indicates calls on an extension should never been recorded.
2. "100% record", which indicates that all calls on the extension should be recorded.
3. "Application driven record", which means the telephony components receive instructions from applications of, for example, a recording system or a policy system, to initiate a recording session of a call on the extension.
4. Record communication sessions based on business rules of the communication system, the business rules including recording all communication sessions in a queue or at a predetermined time.

In block 610, the proxy server stores recording information received from the customer center telephony system or the recording subsystem, among others. The recording information can include the recording options as mentioned above for initiating a recording session.

In block 615, the proxy server communicates with the customer center telephony system or the recording subsystem and determines whether to record the media streams associated with the interaction based on the communication. In block 620, responsive to the determination to record the media streams, the proxy server provides recording instructions to the customer center telephony system and the recording system based on the recording information.

In the first two options mentioned above, the customer center telephony system receives the calls and determines whether to invoke the calls to the proxy server for recording. In the "application driven record" option, the customer center telephony system waits to receive instructions from the recording system and a policy system. For example, the recording system may get the events of the calls on the agent phones via a CTI link. The instructions for recording from the recording system can be delivered via the CTI link to the customer center telephony system. In turn, the customer center telephony system can invoke the call recording session.

Alternatively or additionally, the instructions for recording can be sent to the customer center telephony system in the form of the call control protocol to directly invoke the call recording session. Alternatively or additionally, the customer center's telephony infrastructure may choose to set a recording option to all extensions as a default option. For example, the customer center telephony system can set "application driven record" as the recording option without any configuration involved. In this case, the proxy server invokes the requests for recording the media streams.

In a recording system where a hybrid recording mode is provided, the proxy server can decide if it needs to instruct the telephony system for active recording based on whether the call is already being recorded using the sniffing method.

In block 625, the media streams associated with the interaction within the customer center telephony system are associated with each other so that, for example, the media streams can be stitched together as a single recording for archival and replay. In block 630, the proxy server or the customer center telephony system initiates a recording session with the recording system. In block 635, the recording system receives and records the media streams based on the recording instructions from the proxy server.

Flow Diagram Depicting Operation of a Proxy Server

Figure 7:
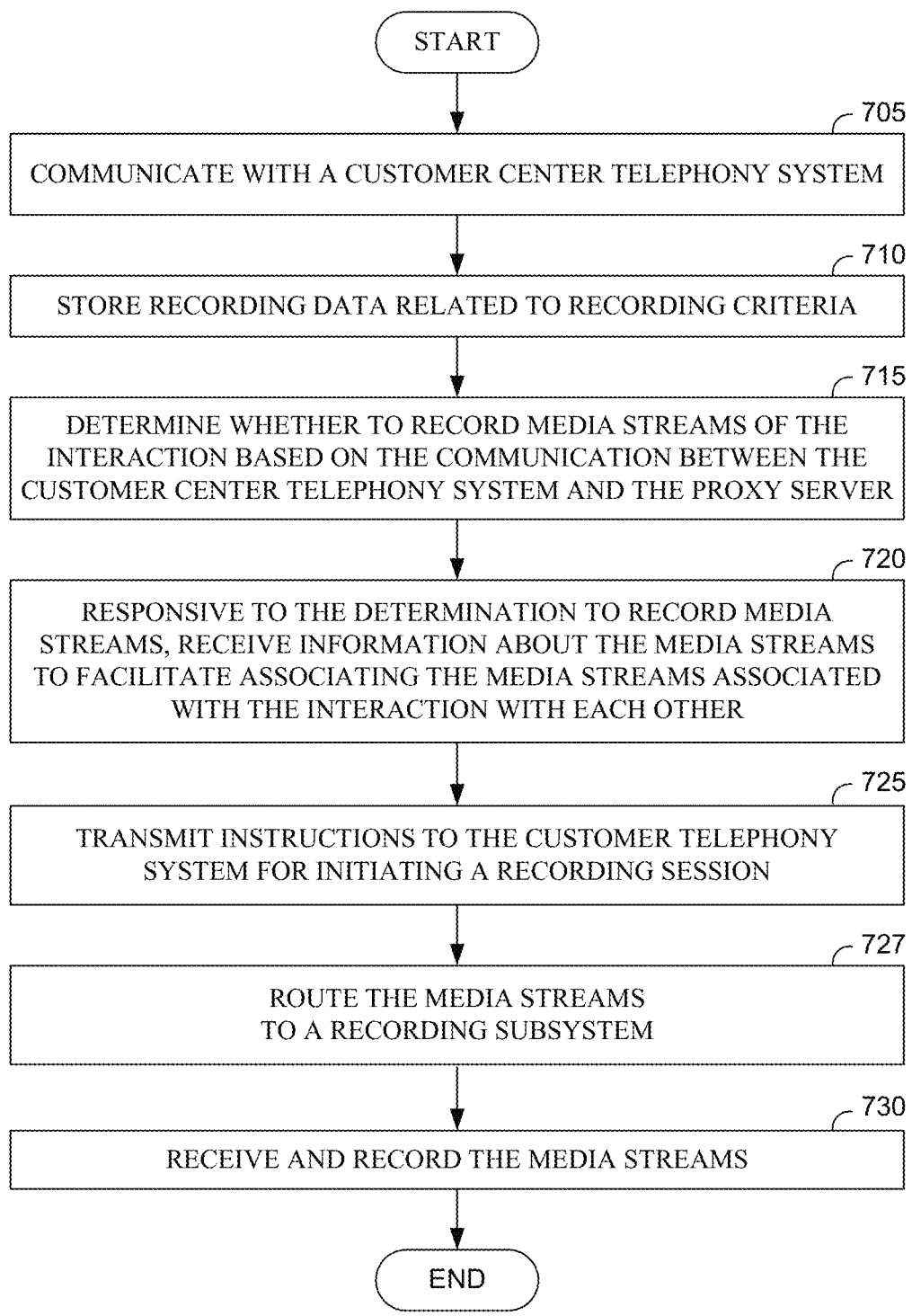
FIG. 7 is a flow diagram that illustrates an exemplary operation for recording an interaction between a customer and an agent using a proxy server, such as that shown in FIG. 1.

FIG. 7 is a flow diagram that illustrates an exemplary operation for recording an interaction between a customer and an agent using a proxy server, such as that shown in FIG. 1. In block 705, the proxy server communicates with a customer center telephony system. The communication is related to the recordation of the interaction between the customer and the agent. In block 710, the proxy server stores data that includes recording criteria corresponding to the recordation of the media streams associated with the interaction. The data is generally saved in the cache of the proxy server.

In block 715, the proxy server determines whether to record the media streams associated with the interaction based on the communication between the customer center telephony system and the proxy server. For example, the customer center telephony system can invoke the proxy server to record the interaction. The proxy server receives information pertaining to the invocation from the customer center telephony system and facilitates the process for recording the interaction.

In block 720, responsive to the determination of recording the media streams, the proxy server receives information about the media streams to facilitate associating the media streams with each other. In block 725, the proxy server transmits instructions to the customer center telephony system for initiating a recording session. The instructions include duplicating the media streams and transmitting the duplicated media streams to a recording subsystem of the recording system. Alternatively or additionally, the instructions can include transmitting the duplicated media streams to the proxy server, which relays the duplicated media streams to the recording subsystem. Alternatively or additionally, the proxy server can provide instructions to the recording system to initiate the recording session.

In block 727, the proxy server can intelligently route requests to the recorders based on various criteria, policies, or recorder conditions. Alternatively, the customer center telephony system can also intelligently route requests to the recorders based on various criteria, policies, or recorder conditions. In this regard, either the proxy server or the customer center telephony system, or both, can:

(1) Balance call load by routing calls to the recorders based on the information of the recorders, such as current recording load and CPU usage, among others;
(2) Route calls to recorders based on information in the call control protocols (e.g., tie two streams associated with a single call to the same recorder) or other policies such as co-residency of media, co-residency of media includes, but is not limited to, voice and screen capture, among others;
(3) Route calls to the recorders based on a network topology and costs;
(4) Redirect calls to different proxy servers based on the network topology and the recording load; and
(5) Reject the call if hybrid recording mode is configured on the recorders and one of the recorder is already recording the call via passive method; and
(6) Rejecting the media stream based on runtime or configuration criteria, the criteria including the recorder being over-loaded.

In block 730, the recording subsystem receives and records the media streams based on the associated information. The information to associate the media streams can be passed to the recording system via the call control protocol, such as SIP or H323, or via the CTI link. The recording system can use the information associated with the call to stitch the two media streams and record them as a single media stream. For example, a left media stream can be associated with a right media stream by using a unique identification stored in the left and right media streams. The unique identification corresponds to the interaction.

Alternatively or additionally, the left and right media streams are transmitted to first and second recording subsystems of the recording system, respectively. The first and second recording subsystems provide the left and right media streams, respectively, to be stitched together as a single stream at, for example, archival and replay systems. Alternatively or additionally, the left and right media streams can be transmitted from the customer center telephony system to the archival and/or replay systems, which both can stitched together the left and right media streams as a single stream.

With regard to stitching, some embodiments can, for example, stitch the segments together with no gap at replay, stitch the segments together with a gap at replay, stitch the segments together with alternative content at replay (such as silence or other identifiers to signify that secured information has not been recorded and/or deleted and/or is protected from replay). For example, such a system may also provide indication between the stitched sides, which can be, for example, two or more sides that would provide indication to a user that something was removed for security purposes.

Network Topology

A network topology is the pattern of links connecting pairs of nodes of a network. The network topology provides the "shape" of a local area network (LAN) or other communications system. A given node has one or more links to others, and the links can appear in a variety of different shapes. The simplest connection is a one-way link between two devices. A second return link can be added for two-way communication. Modern communications cables usually include more than one wire in order to facilitate this, although very simple bus-based networks have two-way communication on a single wire.

One way, among others, to add more computers into a network is by daisy-chaining, or connecting each computer in series to the next. If a message is intended for a computer partway down the line, each system bounces the message along in sequence until the message reaches the destination. A daisy-chained network can take two basic forms: linear and ring.

A linear topology puts a two-way link between one computer and the next. By connecting the computers at each end, a ring topology can be formed. An advantage of the ring is that the number of transmitters and receivers can be cut in half, since a message will eventually loop all of the way around. When a node sends a message, each computer in the ring processes the message. If a computer is not the destination node, the computer passes the message to the next node, until the message arrives at its destination. If the message is not accepted by any node on the network, the message travels around the entire ring and returns to the sender. This potentially results in a doubling of travel time for data, but since the message is traveling at a significant fraction of the speed of light, the loss is usually negligible.

Another network topology, among others, is a star topology, which reduces the chance of network failure by connecting all of the systems to a central node. When applied to a bus-based network, this central hub rebroadcasts the transmissions received from any peripheral node to the peripheral nodes on the network, sometimes including the originating node. The peripheral nodes may thus communicate with all others by transmitting to, and receiving from, the central node only. The failure of a transmission line linking the peripheral nodes to the central node can result in the isolation of that peripheral node from all others, but the rest of the system remains unaffected.

Another network topology, among others, is a tree topology, which can be viewed as a collection of star networks arranged in a hierarchy. The tree topology has individual peripheral nodes (e.g., leaves) which are used to transmit to and receive from one other node only and may not act as repeaters or regenerators. Unlike the star network, the function of the central node may be distributed.

As in the conventional star network, individual nodes may thus still be isolated from the network by a single-point failure of a transmission path to the node. If a link connecting a leaf fails, that leaf is isolated; if a connection to a non-leaf node fails, an entire section of the network becomes isolated from the rest.

In order to alleviate the amount of network traffic that comes from broadcasting everything everywhere, more advanced central nodes were developed that would keep track of the identities of different systems connected to the network. These network switches can "learn" the layout of the network by first broadcasting data packets everywhere, then observing where response packets come from.

In a mesh topology, there are at least two nodes with two or more paths between them. A special kind of mesh, limiting the number of hops between two nodes, is a hypercube. The number of arbitrary forks in mesh networks makes them more difficult to design and implement, but their decentralized nature makes them very useful. This is similar in some ways to a grid network, where a linear or ring topology is used to connect systems in multiple directions. A multi-dimensional ring has a toroidal topology, for instance.

A fully connected, complete topology or full mesh topology is a network topology in which there is a direct link between all pairs of nodes. In a fully connected network with n nodes, there are $n(n-1)/2$ direct links. Networks designed with this topology are usually very expensive to set up, but have a high amount of reliability due to multiple paths data can travel on.

Hybrid networks use a combination of any two or more topologies in such a way that the resulting network does not have one of the standard forms. For example, a tree network connected to a tree network is still a tree network, but two star networks connected together (known as extended star) exhibit hybrid network topologies. A hybrid topology is always produced when two different basic network topologies are connected. Two common examples for Hybrid network are: star ring network and star bus network. The Star ring network consists of two or more star topologies connected using a multistation access unit (MAU) as a centralized hub. The Star Bus network consists of two or more star topologies connected using a bus trunk (the bus trunk serves as the network's backbone).

While grid networks have found popularity in high-performance computing applications, some systems have used genetic algorithms to design custom networks that have the fewest possible hops in between different nodes. Some of the resulting layouts are nearly incomprehensible, although they do function quite well.

Flow Diagram Depicting Operation of a Proxy Server in a Secure Environment

Figure 8:
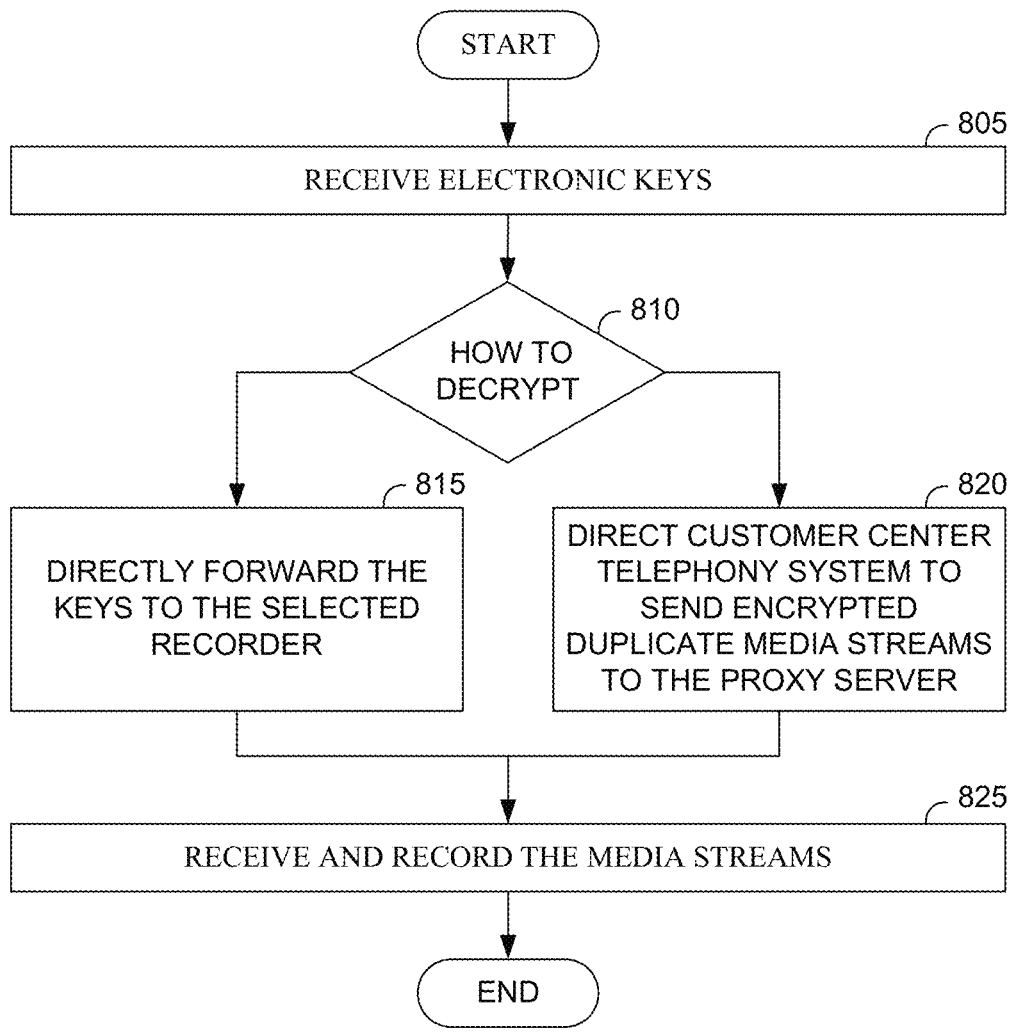
FIG. 8 is a flow diagram that illustrates an exemplary operation of an embodiment of a proxy server, such as that shown in FIG. 1 that facilitates recording encrypted media streams from the customer center telephony system.

FIG. 8 is a flow diagram that illustrates operation of an embodiment in which a proxy server facilitates recording of encrypted media streams from the customer center telephony system. In the case where encryption is used in the customer center telephony system, duplicated media streams delivered to the recording system can be encrypted. The encrypted media streams have electronic keys for decryption of the media streams. In block 805, the electronic keys can be delivered to the proxy server from a telephony component such as a phone, which sends the encrypted duplicated media streams, in a secure connection. The secure connection may be achieved via a secure version of the call control protocols such as secure session initiation protocol (SIP) using transport layer security (TLS) or via a secure CTI link.

Upon detecting encryption and receiving the electronic keys, the proxy server determines how to decrypt the encrypted media streams, shown in block 810. The proxy server may choose to directly forward the keys to the selected recorder via a secure connection, shown in block 815. Again the secure connection may be a secure version of standard call control protocols such as secure sockets layer (SSL) and transport layer security (TLS) or proprietary socket connection secured by SSL or TLS.

In the scenario where the proxy server chooses to proxy the media streams, the proxy server directs the customer center telephony system to send the encrypted duplicated media streams to itself, shown in block 820. The proxy server decrypts the encrypted media streams using the electronic keys passed from the customer center telephony system. The proxy server forwards the decrypted media streams to the selected recorders via a secure connection between the recorder and itself. In block 825, the recording subsystem can receive and record the media streams.

Secure Sockets Layer (SSL) and Transport Layer Security (TLS)

Secure Sockets Layer (SSL) and Transport Layer Security (TLS), its successor, are cryptographic protocols which provide secure communications on the Internet for such things as e-mail, internet faxing, and other data transfers. There are slight differences between SSL and TLS, but the protocol remains substantially the same. The term "SSL" as used here applies to both protocols unless clarified by context.

SSL provides endpoint authentication and communications privacy over the Internet using cryptography. In typical use, only the server is authenticated (e.g., its identity is ensured) while the client remains unauthenticated; mutual authentication requires public key infrastructure (PKI) deployment to clients. The protocols allow client/server applications to communicate in a way designed to prevent eavesdropping, tampering, and message forgery.

SSL involves three basic phases: 1) Peer negotiation for algorithm support, 2) Public key encryption-based key exchange and certificate-based authentication, and 3) Symmetric cipher-based traffic encryption. The SSL protocol exchanges records; each record can be optionally compressed, encrypted and packed with a message authentication code (MAC). Each record has a content_type field that specifies which protocol is being used.

In general, the client sends and receives several handshake structures as follows. The client sends a ClientHello message specifying the list of cipher suites, compression methods and the highest protocol version it supports. Then the client receives a ServerHello, in which the server chooses the connection parameters from the choices offered by the client earlier.

When the connection parameters are known, client and server exchange certificates (depending on the selected public key cipher). The server can request a certificate from the client, so that the connection can be mutually authenticated. Client and server negotiate a common secret called "master secret", or simply encrypting a secret with a public key that is decrypted with the peer's private key. Other key data is derived from this "master secret" (and the client and server generated random values), which is passed through a carefully designed "Pseudo Random Function".

TLS/SSL have a variety of security measures. Some security measures, among others, are numbering all the records and using the sequence number in the MACs and using a message digest enhanced with a key (so only with the key can you check the MAC).

TLS/SSL protect against several "attacks," like those involving a downgrade of the protocol to previous (less secure) versions, or weaker cipher suites. TLS/SSL include a hash algorithm in which the message that ends the handshake ("Finished") sends a hash of the exchanged data seen by both parties.

TLS/SSL further include a pseudo random function that splits the input data in two (2) halves and processes them with different hashing algorithms (e.g., Message-Digest algorithm 5 (MD5) and Secure Hash Algorithm (SHA)). Then the pseudo random function logically processes (e.g., XOR) the two (2) halves together. This way the data protects itself in the event that one of these algorithms is found vulnerable.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, having thus described the disclosure, at least the following is claimed:

1. A method for recording a communication session between a customer and an agent comprising:
   a proxy server communicating with a customer center communication system via a communication component of the customer center communication system, the communication component being operative to be configured to enable recording and encrypting of media streams associated with a communication session, the communication component being further operative to transmit the encrypted media streams over a network based on the configuration of the communication component, wherein the encrypted media streams have electronic keys for decryption of the media streams;
   the proxy server receiving the electronic keys from the communication component of the customer center communication system;
   the proxy server determining whether to record the encrypted media streams based on the configuration of the communication component;
   the proxy server determining one or more recorders from a plurality of recorders to record the encrypted media streams based on call control protocols;
   the proxy server transmitting instructions to the customer center communication system to duplicate the encrypted media streams and to transmit the encrypted duplicated media streams over the network to the proxy server;

the proxy server decrypting the encrypted duplicated media streams using the electronic keys;

the proxy server stitching the decrypted duplicated media streams together to form a single media stream; and the proxy server forwarding the single media stream to the one or more recorders via a secure connection between the proxy server and the one or more recorders.

2. The method as defined in claim 1, wherein configuring the communication component includes instructing the communication component to not record the encrypted media streams.

3. The method as defined in claim 1, wherein configuring the communication component includes instructing the communication component to record all encrypted media streams.

4. The method as defined in claim 1, wherein configuring the communication component includes instructing the communication component to record X % of the encrypted media streams, X being greater than 0 percent and less than 100 percent.

5. The method as defined in claim 1, wherein configuring the communication component includes receiving instructions from applications to initiate the recording of the encrypted media streams, the applications including at least one of the recording system and a policy system.

6. The method as defined in claim 1, wherein configuring the communication component includes instructing the communication component to record the encrypted media streams based on business rules of the communication system, the business rules including recording all or X % of the encrypted media streams in a queue or at a predetermined time, X being greater than 0 percent and less than 100 percent.

7. The method as defined in claim 1, wherein the secure connection is achieved via a secure version of the call control protocols.

8. The method as defined in claim 7, wherein the secure version is a secure socket layers (SSL) protocol.

9. The method as defined in claim 7, wherein the secure version is a transport layer security (TLS) protocol.

10. A system for recording a communication session between a customer and an agent, comprising:

a proxy server operative to:

communicate with a customer center communication system having a communication component, the communication component being operative to be configured to enable recording and encrypting of media streams associated with a communication session, the communication component being further operative to transmit the encrypted media streams over a network based on the configuration of the communication component, wherein the encrypted media streams have electronic keys for decryption of the media streams;

receive the electronic keys from the communication component of the customer center communication system;

determine whether to record the encrypted media streams based on the configuration of the communication component, determine one or more recorders from a plurality of recorders to record the encrypted media streams based on call control protocols;

transmit instructions to the customer center communication system to duplicate the encrypted media streams and to transmit the encrypted duplicated media streams over the network to the proxy server;

decrypt the encrypted duplicated media streams using the electronic keys;

stitch the decrypted duplicated media streams together to form a single media stream; and forward the single media stream to the one or more recorders via a secure connection between the proxy server and the one or more recorders.

11. The system as defined in claim 10, wherein the communication component is configured to not record the encrypted media streams.

12. The system as defined in claim 10, wherein the communication component is configured to record all the encrypted media streams.

13. The system as defined in claim 10, wherein the communication component is configured to record X % of the encrypted media streams, X being greater than 0 percent and less than 100 percent.

14. The system as defined in claim 10, wherein the communication component is configured to receive instructions from applications to initiate the recording of the encrypted media streams the applications including at least one of the recording system and a policy system.

15. The system as defined in claim 10, wherein the communication component is configured to record the encrypted media streams based on business rules of the communication system, the business rules including recording all or X % of the encrypted media streams in a queue or at a predetermined time, X being greater than 0 percent and less than 100 percent.

16. The system as defined in claim 10, wherein an encrypted media stream includes at least one audio stream or video stream associated with the communication session.

17. The system as defined in claim 11, wherein the secure connection is achieved via a secure version of the call control protocols.

18. The system as defined in claim 17, wherein the secure version is a secure socket layers (SSL) protocol.

19. The system as defined in claim 17, wherein the secure version is a transport layer security (TLS) protocol.

20. A non-transitory computer-readable medium having computer-executable instructions stored thereon for recording a communication session between a customer and an agent, when executed by a computing device, causes the computing device to:

communicate with a customer center communication system having a communication component, the communication component being operative to be configured to enable recording and encrypting of media streams associated with a communication session, the communication component being further operative to transmit the encrypted media streams over a network based on the configuration of the communication component, wherein the encrypted media streams have electronic keys for decryption of the media streams;

receive the electronic keys from the communication component of the customer center communication system;

determine whether to record the encrypted media streams based on the configuration of the communication component, determine one or more recorders from a plurality of recorders to record the encrypted media streams based on call control protocols;

transmit instructions to the customer center communication system to duplicate the encrypted media streams and to transmit the encrypted duplicated media streams over the network to the proxy server;

decrypt the encrypted duplicated media streams using the electronic keys;

stitch the decrypted duplicated media streams together to form a single media stream; and forward the single media stream to the one or more recorders via a secure connection between the computing device and the one or more recorders.

* * * * *